US011235431B2

(12) United States Patent
Zell

(10) Patent No.: US 11,235,431 B2
(45) Date of Patent: Feb. 1, 2022

(54) WORKPIECE BASKET SYSTEM AND SET OF WORKPIECE BASKET SYSTEMS

(71) Applicant: Zell Systemtechnik GmbH, Donau (DE)

(72) Inventor: Ingo Zell, Ehingen-Volkersheim (DE)

(73) Assignee: ZELL SYSTEMTECHNIK GMBH, Donau (DE)

( * ) Notice: Subject to any disclaimer, the term of this patent is extended or adjusted under 35 U.S.C. 154(b) by 196 days.

(21) Appl. No.: 16/716,885

(22) Filed: Dec. 17, 2019

(65) Prior Publication Data

US 2021/0154782 A1     May 27, 2021

(30) Foreign Application Priority Data

Nov. 27, 2019 (EP) .................................... 19211726

(51) Int. Cl.
*B23Q 1/03* (2006.01)
*B25H 3/06* (2006.01)

(52) U.S. Cl.
CPC .............. *B23Q 1/037* (2013.01); *B25H 3/06* (2013.01)

(58) Field of Classification Search
CPC . B25H 3/00; B25H 3/003; B25H 3/04; B25H 3/06; B65D 1/38; B65D 21/00; B65D 21/08; B65D 21/083; B65D 25/10; B65D 25/103; B65D 25/105; B65D 5/50; B65D 71/70
See application file for complete search history.

(56) References Cited

U.S. PATENT DOCUMENTS

| 5,294,009 A | 3/1994 | Maurer et al. |
| 2012/0061930 A1 | 3/2012 | Lin |
| 2012/0085714 A1 | 4/2012 | Johnson |
| 2015/0190920 A1 | 7/2015 | Karlsson et al. |
| 2019/0009403 A1 | 1/2019 | Huang |

FOREIGN PATENT DOCUMENTS

| DE | 202014102215 U1 * | 6/2014 | ........... B65D 21/083 |
| DE | 20 2016 102444 U1 | 6/2016 | |
| DE | 10 2016 006620 A1 | 11/2017 | |
| GB | 927 767 A | 6/1963 | |
| GB | 2 241 940 A | 9/1991 | |
| WO | 2017/191628 A1 | 11/2017 | |
| WO | 2019/020294 A1 | 1/2019 | |

OTHER PUBLICATIONS

Machine translation of DE202014102215 from Espacenet. https://worldwide.espacenet.com/publicationDetails/biblio?CC=DE&NR=202014102215U1&KC=U1&FT=D&ND=3&date=20140611&DB=&locale=en_EP (Year: 2021).*
European Search Report in EP 19211726.5-1017, dated Jun. 22, 2020, with English translation.

* cited by examiner

*Primary Examiner* — Tyrone V Hall, Jr.
(74) *Attorney, Agent, or Firm* — Collard & Roe, P.C.

(57) ABSTRACT

A workpiece basket system includes at least one replaceable workpiece carrier insert and one frame with a holding device for the at least one workpiece carrier insert, which may be inserted or is inserted into the frame, so that when the at least one workpiece carrier insert is inserted, the frame and the at least one workpiece carrier insert together form a workpiece basket. The frame is designed in such a way that multiple frames are stackable one on top of the other, and the holding device is designed in such a way that it holds the workpiece carrier insert in a detachable manner.

14 Claims, 10 Drawing Sheets

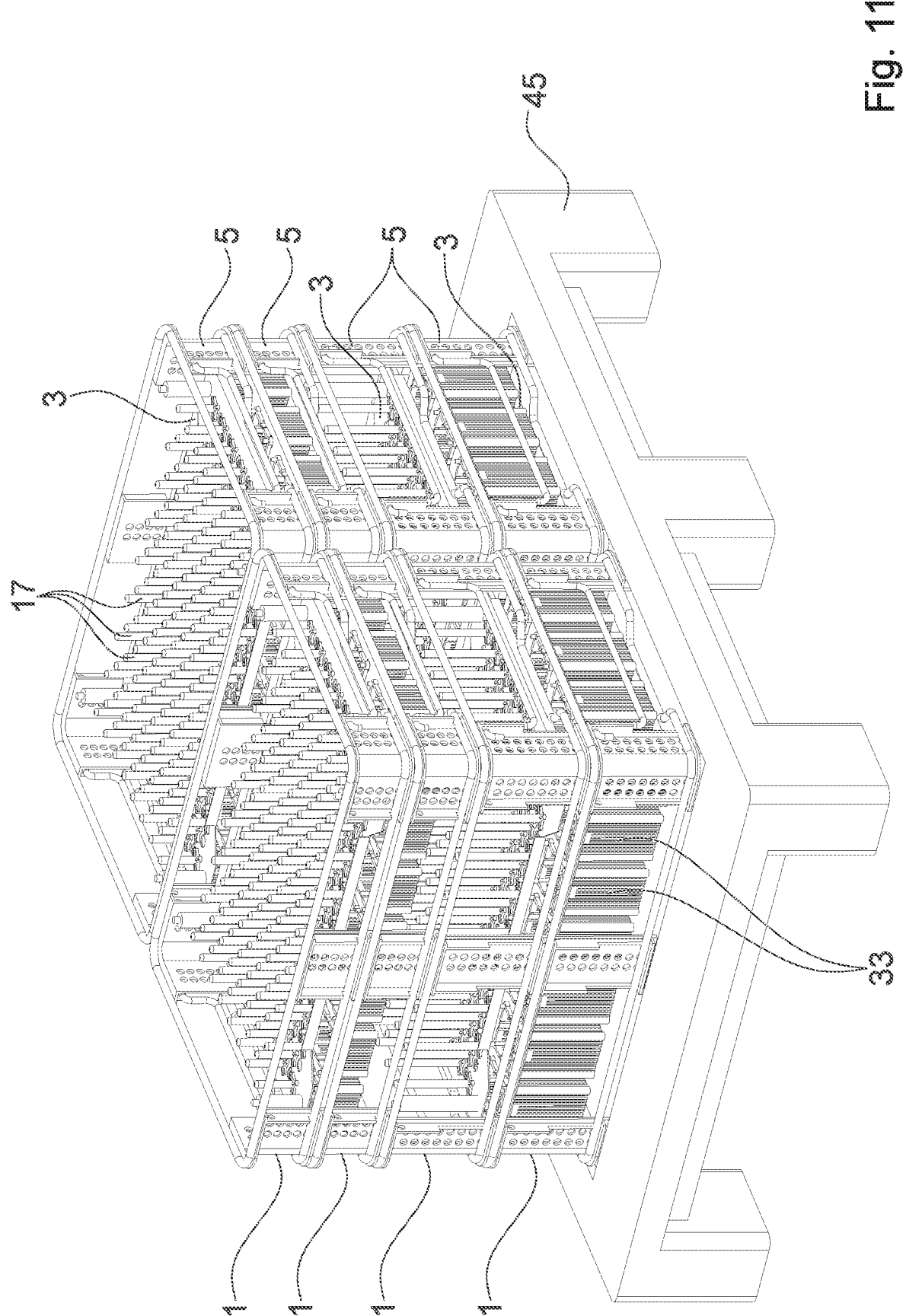

WORKPIECE BASKET SYSTEM AND SET OF WORKPIECE BASKET SYSTEMS

CROSS REFERENCE TO RELATED APPLICATIONS

Applicant claims priority under 35 U.S.C. § 119 of European Application No. 19 211 726.5 filed Nov. 27, 2019, the disclosure of which is incorporated by reference.

BACKGROUND OF THE INVENTION

1. Field of the Invention

The invention relates to a workpiece basket system comprising a frame and at least one workpiece carrier insert, which may be inserted into the frame to form, together with the frame, a workpiece basket. The invention further relates to a set of multiple workpiece basket systems.

2. Description of the Related Art

Workpiece baskets are used to hold workpieces during their production, for transporting, for washing or for storage. With holders and receptacles for the workpiece basket, it is possible to hold the workpieces in a desired position and to group them. Workpiece baskets enable the workpieces in conjunction with the production process to be fed to one or to multiple production stations and to be processed and/or to be transported between the production stations and/or to be stored between the production steps. Production steps such as washing, mechanical processing or thermal curing may be performed in the production stations.

Conventional workpiece baskets include holders or receptacles for workpieces as integral components of the workpiece basket. The base and height of the workpiece basket and the design of its holders or receptacles are adapted to the workpieces to be machined and/or to the production station in which the workpiece basket is used. A change in the production process requires the entire workpiece basket to be replaced. Even a minor change in the design of the workpieces to be produced may result in the replacement of the workpiece basket, since the holders or the receptacles no longer match the changed design.

SUMMARY OF THE INVENTION

The object is to provide a material-saving approach to the provision of workpiece baskets. For this purpose, a work basket system and a set of work baskets according to the subordinate claims are provided.

The workpiece basket system comprises at least one replaceable workpiece carrier insert and a frame with a holding device for the at least one workpiece carrier insert which may be inserted or is inserted into the frame, so that when the at least one workpiece carrier insert is inserted, the frame and the at least one workpiece carrier insert together form a workpiece basket. The frame is designed in such a way that multiple frames are stackable one on top of the other. The holding device is designed in such a way that it holds the workpiece carrier insert in a detachable manner.

The workpiece basket system comprises, on the one hand, the workpiece carrier insert and the frame as individual components and, on the other hand, the workpiece basket consisting of the frame with inserted workpiece carrier. By assembling the frame and workpiece carrier insert, a workpiece basket is formed, which may be disassembled again into the frame and workpiece carrier insert by disassembling the components. By replacing the workpiece carrier insert with another workpiece carrier insert and by inserting it into the frame, it is possible to adapt the workpiece basket to other workpieces when the production process is changed. The replaced workpiece carrier insert may also be reused and, for example, assembled with a higher or lower frame to form a workpiece basket.

When the at least one workpiece carrier insert is inserted in the frame, the at least one workpiece carrier insert is held in such a way that the movement of the workpiece carrier insert is limited relative to the frame, at least with respect to a degree of freedom. This may be a fixed connection in which the workpiece carrier insert can neither slip nor rotate or fall out, so that neither a rotational movement about nor a translational movement in one of the three spatial axis, i.e., x-axis, y-axis, or z-axis, is possible. For many applications, a support of the at least one workpiece carrier insert, which limits only some of the possibilities of movement, is sufficient. This may be a support simply by mounting or inserting the workpiece carrier insert into the frame, in which the workpiece carrier insert is held in the frame as long as the workpiece box is not rotated from top to bottom.

The holding device may be designed in such a way that it holds the workpiece carrier insert in a lower area of the frame, so that the workpiece carrier insert serves as a bottom. In one alternative exemplary embodiment, the workpiece carrier insert is situated in an upper area in order, for example, to enable workpieces to be mounted in the workpiece carrier insert. In another exemplary embodiment, the workpiece carrier area may be situated in a middle area. The holding device may be designed so that it allows a workpiece insert to be held in different positions, for example, above or below or in the middle.

The frame, and the workpiece box formed thereby, is stackable, so that multiple workpiece boxes may be stacked in a production station or during transport or in storage, which correlates with a smaller space requirement in terms of the required storage space. The upperside and underside of the frame are shaped so that they form a positive connection when two frames are situated one on top of the other, which prevents slipping. This can be achieved by increasing the upperside of the frame, which engages in a recess on the underside of the frame. Alternatively, projections on the frame underside engage the upper frame portion of the frame positioned thereunder.

The holding device is advantageously designed in such a way that it holds the at least one workpiece carrier insert by means of a screw connection and/or by means of a press connection and/or by means of assembly and/or by means of friction. A screw connection enables a fixed connection, for example with screws in the four corner areas of the frame. In a press connection, a force-fitting connection takes place via the elastic deformation of at least one of the components to be connected and an undesirable loosening is prevented due to the force-fit. Pressing against and pressing on and clamps are press connections. Assembly includes placement, insertion, mounting and telescopic fitting. A positive connection may be formed during assembly, for example, by hooks and eyes. However, also setting or placing the workpiece carrier insert onto the holding device, so that it is held in its position by gravity and friction, is also considered to be assembling. There are connections in which form and force-fitting are combined, for example, in a locking connection, in which an elastic latching hook is held in a recess.

In one embodiment, the frame is designed for inserting into it multiple workpiece carrier inserts, so that the workpiece carrier inserts are situated one on top of the other and/or side by side. Each of the workpiece carrier inserts may include a holding device, which is connectable to the holding device of the frame or to a holding device of another workpiece carrier insert. Multiple workpiece carrier inserts may be stacked on top of one another, for example, in the same frame so that only the lowermost workpiece carrier insert is held by the holding device of the frame. Multiple such stacked workpiece carrier inserts may be situated side by side in the frame.

In one embodiment, the frame is designed for inserting into it multiple workpiece carrier inserts, at least two of which differ. As a result, the workpiece carrier basket may be equipped with different workpieces, which correlates with a better space utilization.

In one embodiment, the workpiece carrier insert has at least one receptacle or one holder for at least one workpiece. The holder holds the workpiece in a desired position. A receptacle comprises a container for one or multiple workpieces, and is designed, for example, as a plastic basket.

In one embodiment, the receptacle or the holder is detachably connected to a plate of the workpiece carrier insert and is replaceable, so that the workpiece carrier insert is adaptable to changing production processes. The receptacle or holder may be connected by means of a press connection and/or a screw connection or by assembling in order to obtain a fixed but nevertheless detachable connection.

In one embodiment, the workpiece carrier insert comprises a plate with recesses, into which the receptacles and/or the holders for workpieces may be inserted and/or clamped and/or latched. The receptacle or the holder has a foot, the shape of which corresponds to the recess in such a way that it is held inserted in a force-fitting manner or is locked in its position in a force-fitting and positive-locking manner by turning. In one embodiment, receptacles may be inserted or mounted in the recesses.

In one embodiment, the workpiece carrier insert comprises a grid plate, on which the receptacles and/or the holders may be clamped or placed and/or in the grid holes of which the receptacles and/or the holders may be inserted or clamped. The grid plate provides good fastening options at the points of intersection of the grid and in the recesses, wherein the workpieces are also accessible from below due to the grid.

In one embodiment, the workpiece carrier insert comprises metal and/or plastic, and the frame is metal. Metal is a stable material. Plastic enables the production of holders and receptacles of almost any shape and low in weight.

In one embodiment, the frame has a wire upper edge and a wire lower edge which are spaced apart from each other and are fixedly connected by sheet metal strips. Between the sheet metal strips are large area recesses, via which the workpieces are easily accessible from the side.

The frame advantageously includes fold-out handles, which facilitate the transport and stacking of the workpiece boxes.

One set includes a plurality of the workpiece basket systems described above. At least one of the workpiece carrier inserts may be inserted in more than one of the frames to form a workpiece basket so that the set of workpiece baskets may be variously designed.

Each workpiece basket system has a frame height from a group of predefined frame heights, wherein the frame heights of at least two workpiece basket systems of the set differ so that there are different frame heights within the set. By combining various workpiece carrier inserts and various frames, workpiece boxes may be formed that are adaptable to different production requirements and, once used, may be reassembled and reused. The frames of the set may have the same base area. In addition, the frames may also differ with respect to their base area, wherein multiple frames having a smaller base area are stacked side by side on or under a frame having a larger base area.

The workpiece carrier inserts of at least two workpiece basket systems may differ. The receptacles and/or the holders of one of the workpiece carrier inserts may differ in terms of their shape and/or arrangement from the receptacles and/or the holders of another workpiece carrier insert. The different frames and different workpiece carrier inserts result in a modular system for the formation of different workpiece baskets having a high degree of flexibility for the design of workpiece baskets based on the components of the set.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 11 shows a three-dimensional view of one exemplary embodiment of a pallet with multiple workpiece baskets.

DETAILED DESCRIPTION OF PREFERRED EMBODIMENTS

Figure 1:
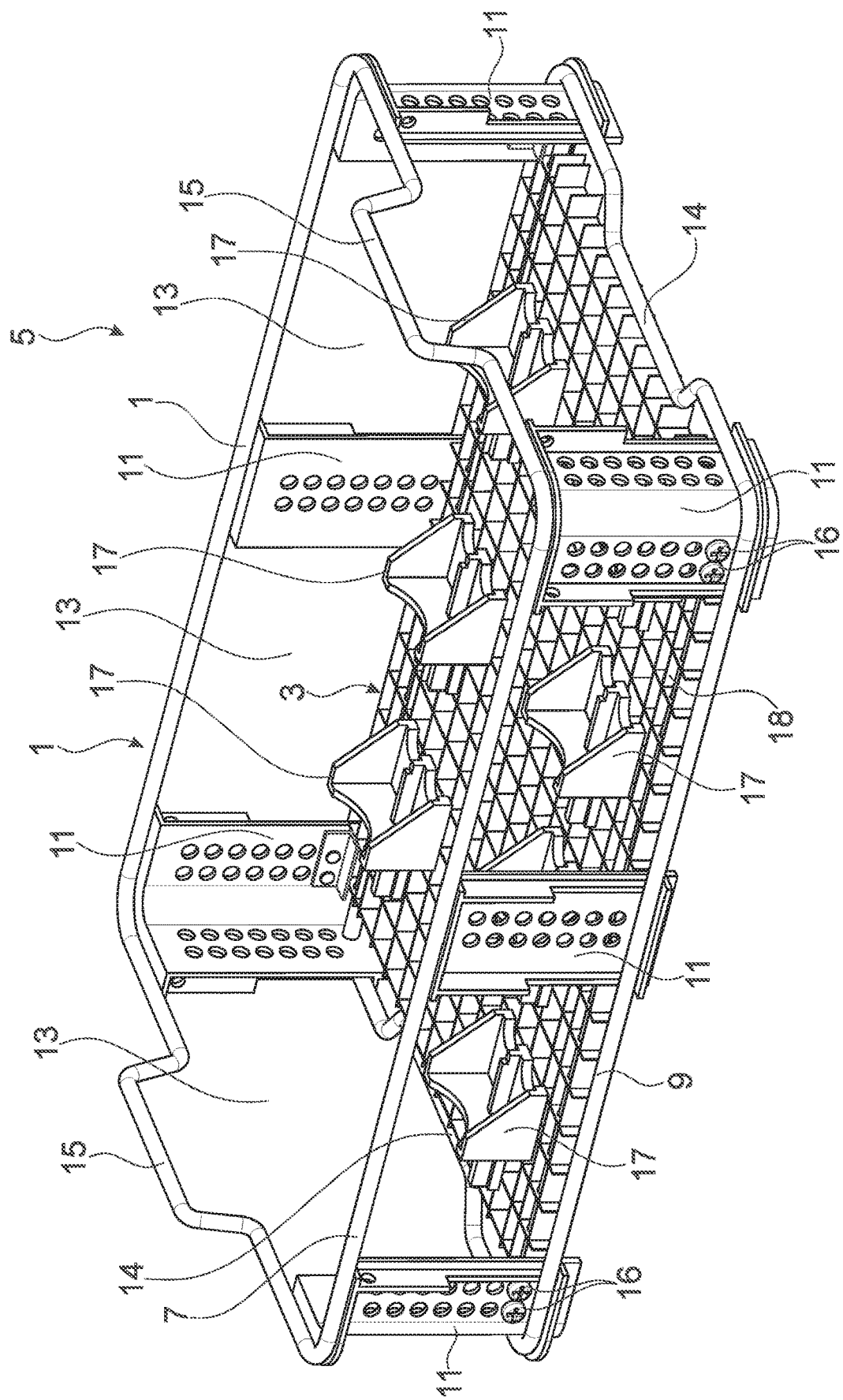
FIG. 1 shows a three-dimensional view of one exemplary embodiment of a workpiece basket system including a frame and a workpiece carrier insert, which form a workpiece basket.

FIG. 1 shows a three-dimensional view of one exemplary embodiment of a workpiece basket system including a frame 1 and a workpiece carrier insert 3. In this workpiece basket system, the workpiece carrier insert 3 is inserted into and held by the frame 1 to form a workpiece basket 5. Nevertheless, the frame 1 and the workpiece carrier insert 3 as non-composite components would also be a workpiece basket system.

The workpiece basket 5 enables the workpieces situated therein (not shown) to be fed to production stations, but also the workpieces to be transported from one production station to another production station and workpieces to be stored between the manufacturing steps.

The frame 1 forms the side wall of the workpiece basket 5. The frame 1 comprises a circumferential upper rigid wire 7 and a circumferential lower rigid wire 9, which form the upper edge and lower edge of the frame 1. Between the wires 7, 9 are perforated sheet metal strips 11, which are fixedly connected to the wires 7, 9, for example, by a welded connection. Instead of the perforated metal strips 11, it is also possible to use metal sheets without holes, grids or rigid wires for connecting wires 7, 9 that form the upper edge and lower edge. Canted perforated sheet metal strips 11 are provided in corner areas of the frame 1 and additional perforated sheet metal strips 11 in the middle area of both longitudinal sides. A stable frame 1 is formed as a result, in which there are large-area recesses 13 between the perforated sheet metal strips 11 to enable lateral access to the workpieces.

On the head sides, the upper wire 7 has upwardly bent sections serving as handles 15. The lower wire 9 has inwardly bent sections 14 on the head sides. At least two of these frames 1 are stackable on top of each other, so that the handles 15 are positioned in the upper wire 7 of the workpiece basket 5 in front of the inwardly bent sections 14 of the lower wire 9 of the workpiece basket 5 stacked thereon, which prevents the frames 1 and thus the workpiece baskets 5 from slipping.

To form the workpiece basket 5, the workpiece carrier insert 3 is inserted into the frame 1, held by the latter and forms the bottom of the workpiece basket 5. In order to hold the workpiece carrier insert 3, a holding device is provided in the frame 1. The workpiece carrier insert 3 can be placed in or on, and/or detachably connected to the holding device. In this exemplary embodiment, the frame 1 holds the workpiece carrier insert 3 by means of screw connections. Screws 16 on the longitudinal sides of the perforated sheet metal strips 11 in the corner areas connect the workpiece carrier insert 3 to the frame 1. Although the screw connections prevent transverse and rotational movements between the frame 1 and the workpiece carrier insert 3, they are detachable and enable the workpiece carrier insert 3 to be replaced.

The workpiece carrier insert 3 comprises a grid plate 18, the size of which corresponds to the frame size in such a way that it may be inserted into the frame 1. Holders 17 for workpieces are clamped on the grid plate 18 of the workpiece carrier insert 3. The holders 17 are made of plastic and have a connecting device on their underside in order to detachably connect them to the grate plate 18.

Figure 2:
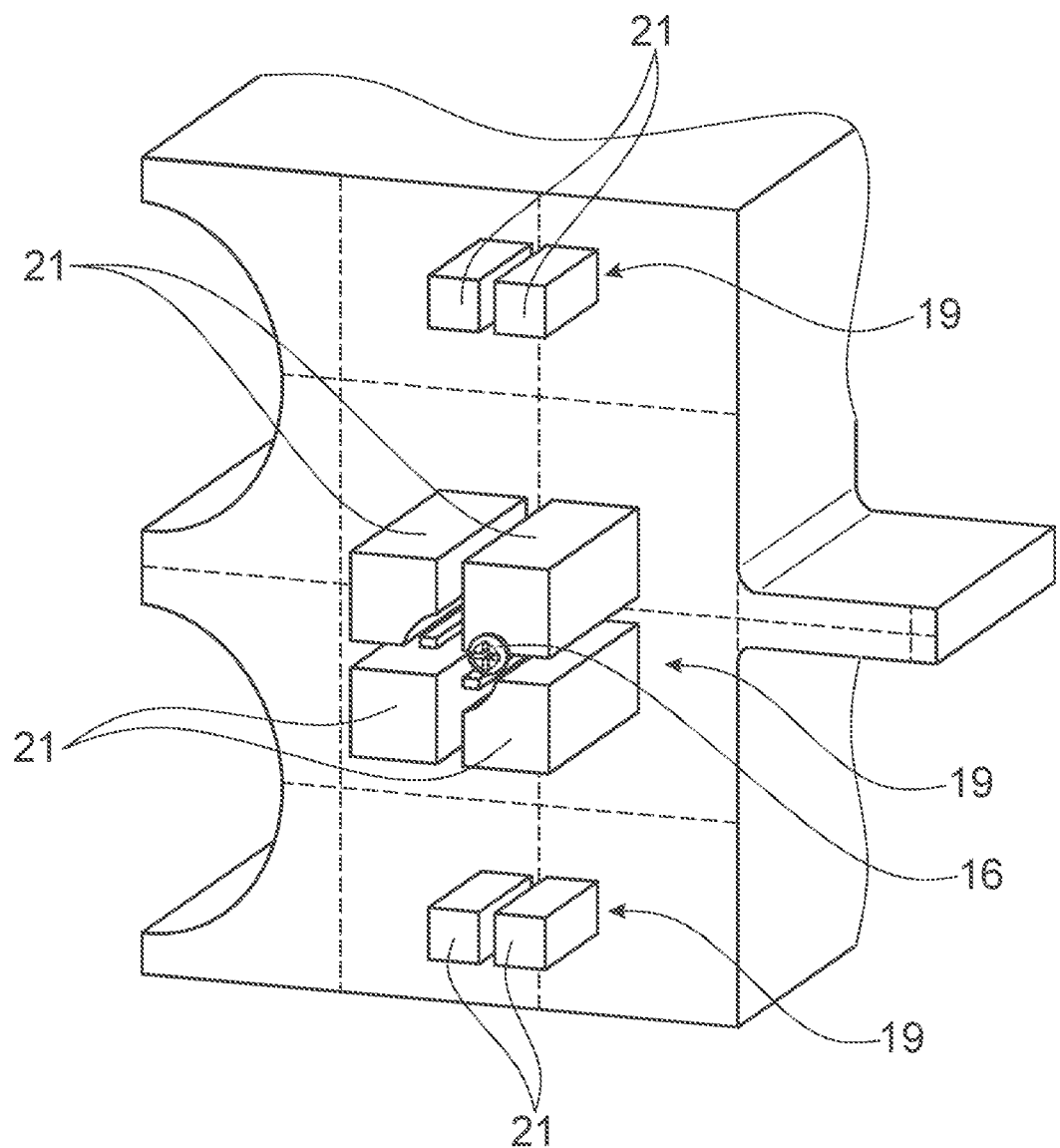
FIG. 2 shows a three-dimensional view of one exemplary embodiment of a holder.

FIG. 2 shows a three-dimensional view of the underside of one exemplary embodiment of such a holder 17 with its connecting device 19, which includes multiple pins 21. For the sake of clarity, the grating plate 18 is not shown, but the course of its flat profiles is indicated by dashed lines.

The connecting device 19 is placed on the grid so that four pins 21 engage in each case an opening of the grid adjacent to the same point of intersection. The height of these pins 21 corresponds to that of the grid. Additional, shorter pins 21, which engage in other openings in openings on both sides of a flat profile, stabilize the position of the holder 17. The connection between the pins 21 and the grid is advantageously force-fitting as a result of the pins 21 being clamped by elastic deformation onto the flat profile to prevent tilting of the holder 17. The connection may be fixed by a screw 16 on the underside of one or of multiple pins 21, so that the screw head protrudes at least partially above the flat profile and prevents the holder 17 from withdrawing or falling out.

The possible provision of multiple holders 17 on the workpiece carrier insert 3, their free positioning capability and replaceability allows for many adaptation options to workpieces and production steps when constructing workpiece baskets 5. The holders 17 may be replaced by differently designed holders 17 and their positioning on the grid plate 18 may be changed. In addition, the workpiece carrier insert 3 may be replaced as a whole.

It is also conceivable that the workpiece carrier insert 3 is formed integrally with one or multiple holders or receptacles for workpieces. In this case as well, the workpiece carrier insert 3 is replaceable as a whole.

Figure 3:
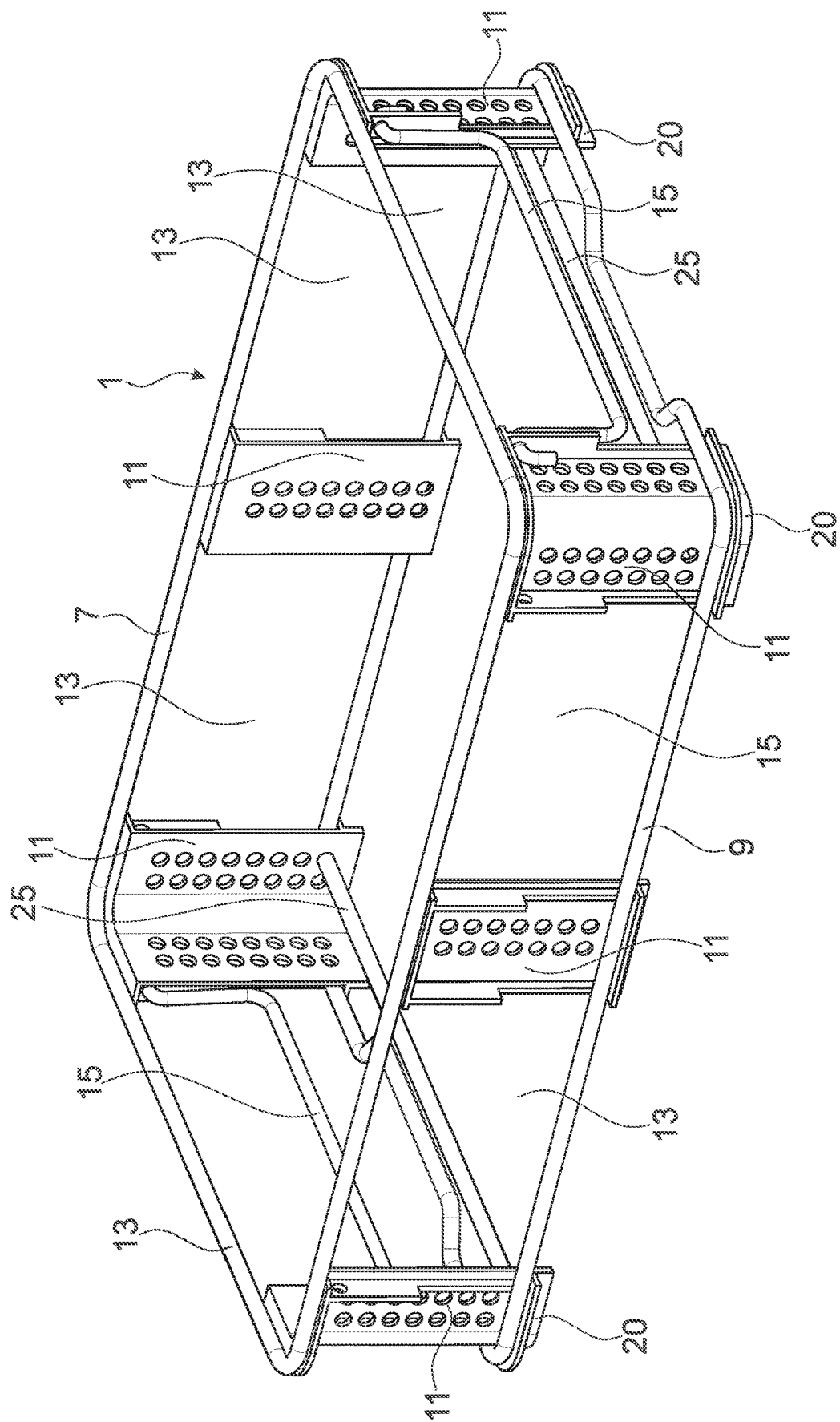
FIG. 3 shows a three-dimensional view of one exemplary embodiment of a frame.

FIG. 3 shows a three-dimensional view of one exemplary embodiment of a frame 1. To avoid repetition, the description focuses on differences from the frame 1 in the previously described exemplary embodiment of the workpiece basket system.

In this exemplary embodiment, the upper wire 7 extends in a plane. The handles 15 are hinged mounted on the head sides of the frame 1. The perforated sheet metal strips 11 extend from the upper wire 7 beyond the lower wire 9 and form projections 20 below the lower wire 9, which engage below the wire on the innerside of the upper wire 7 of the frame 1 during the stacking of such a frame 1, and prevent slipping.

The holding device for holding a workpiece carrier insert (not shown in FIG. 3) comprises two parallel rods 25 running through the frame interior, which are fastened to opposite longitudinal sides of the frame 1. The rods 25 are attached to the corner-side perforated sheet metal strip 11 in the lower area of the frame 1, for example, by welding or with screws.

One workpiece carrier insert 3 or multiple workpiece carrier inserts 3 stacked on top of each other may be placed onto the rods 25. In one exemplary embodiment, the frame 1 is able to hold the workpiece carrier insert or inserts 3 merely due to their gravity. Slippage may be prevented by the perforated metal strips 11 of the frame 1, which act as a stop. Alternatively, folded edges, holders, hooks or the like may be provided on the workpiece carrier insert 3, which are placed or pushed onto the rods 25.

In another exemplary embodiment (not shown in FIG. 3) additional rods 25 are provided, which are fastened, for example, to the perforated metal strips 11 in the central area of the longitudinal sides. The rods 25 extend in parallel and are in a plane. In such a frame 1, two workpiece carrier inserts 3 may be placed side by side.

Figure 4:
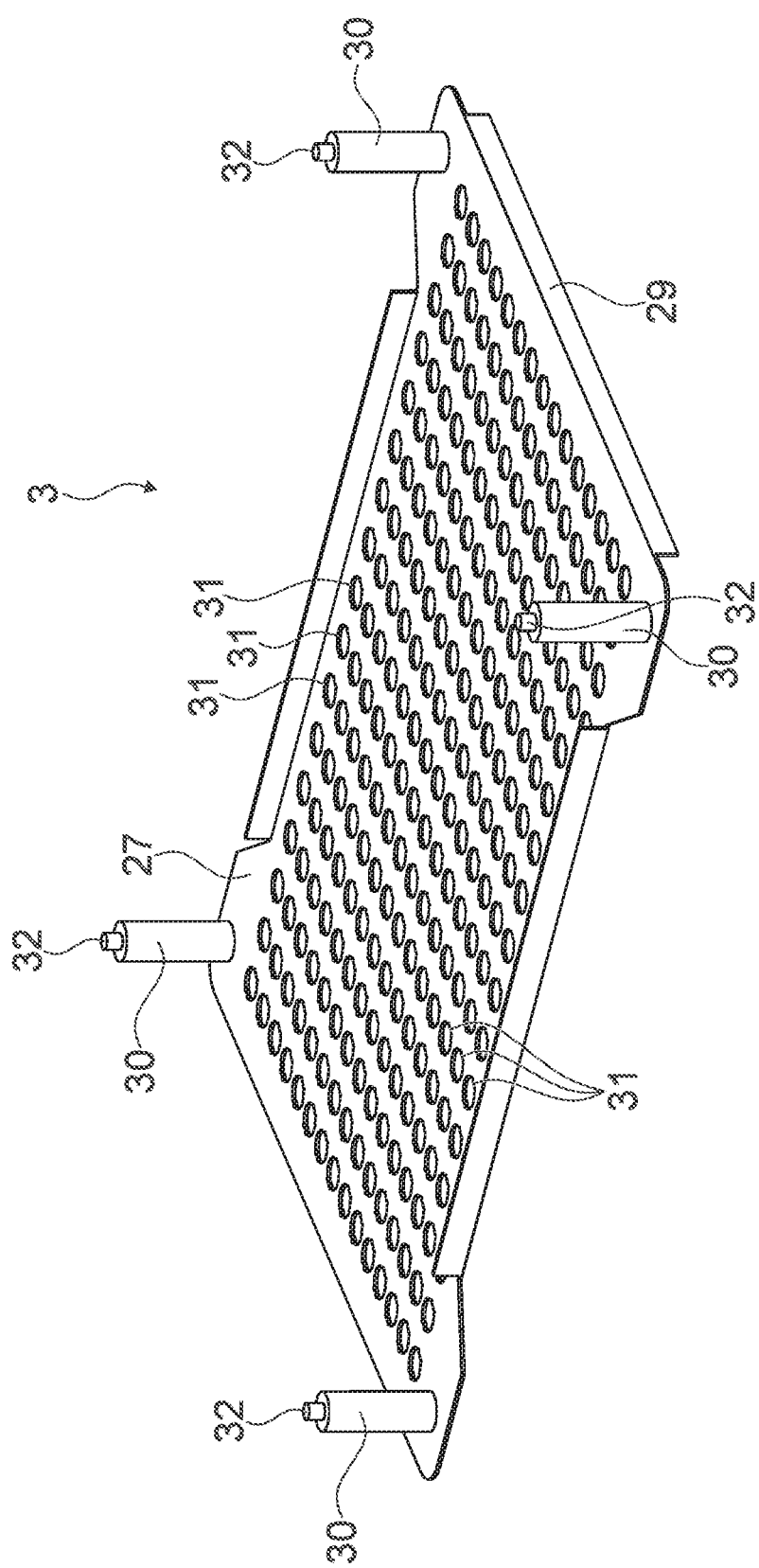
FIG. 4 shows a three-dimensional view of one exemplary embodiment of a workpiece carrier insert.

FIG. 4 shows a three-dimensional representation of one exemplary embodiment of a workpiece carrier insert 3, which may be inserted into the frame 1 described in FIG. 3. The workpiece carrier insert 3 comprises a metal plate 27 folded on the opposite sides, which may be placed on the rods 25 of the frame 1, so that the rods 25 are positioned between the edges 29. The distance between the edges 29 of the plate 27 corresponds to the distance between the sides of the rods 25 facing the frame 1, so that slippage of the plate 27 is avoided.

The plate 27 has a plurality of recesses 31, i.e., holes, in which holders 17 for workpieces may be inserted. Alternatively, an engagement or mounting of workpieces in the recesses 31 is possible. In this exemplary embodiment, the recesses 31 are situated in the shape of a matrix on the plate 27.

On its upper side, the plate 27 includes cylindrical spacers 30, by means of which multiple plates 27 are stackable one on top of the other. In order to prevent slippage of the plates 27, the spacer 30 includes a pin 32 on its upper side, which engages in a recess on the underside of the plate 27 situated thereon. The recess may be formed, for example, by a sleeve or blind hole situated on the underside of the plate 27.

Figure 5:
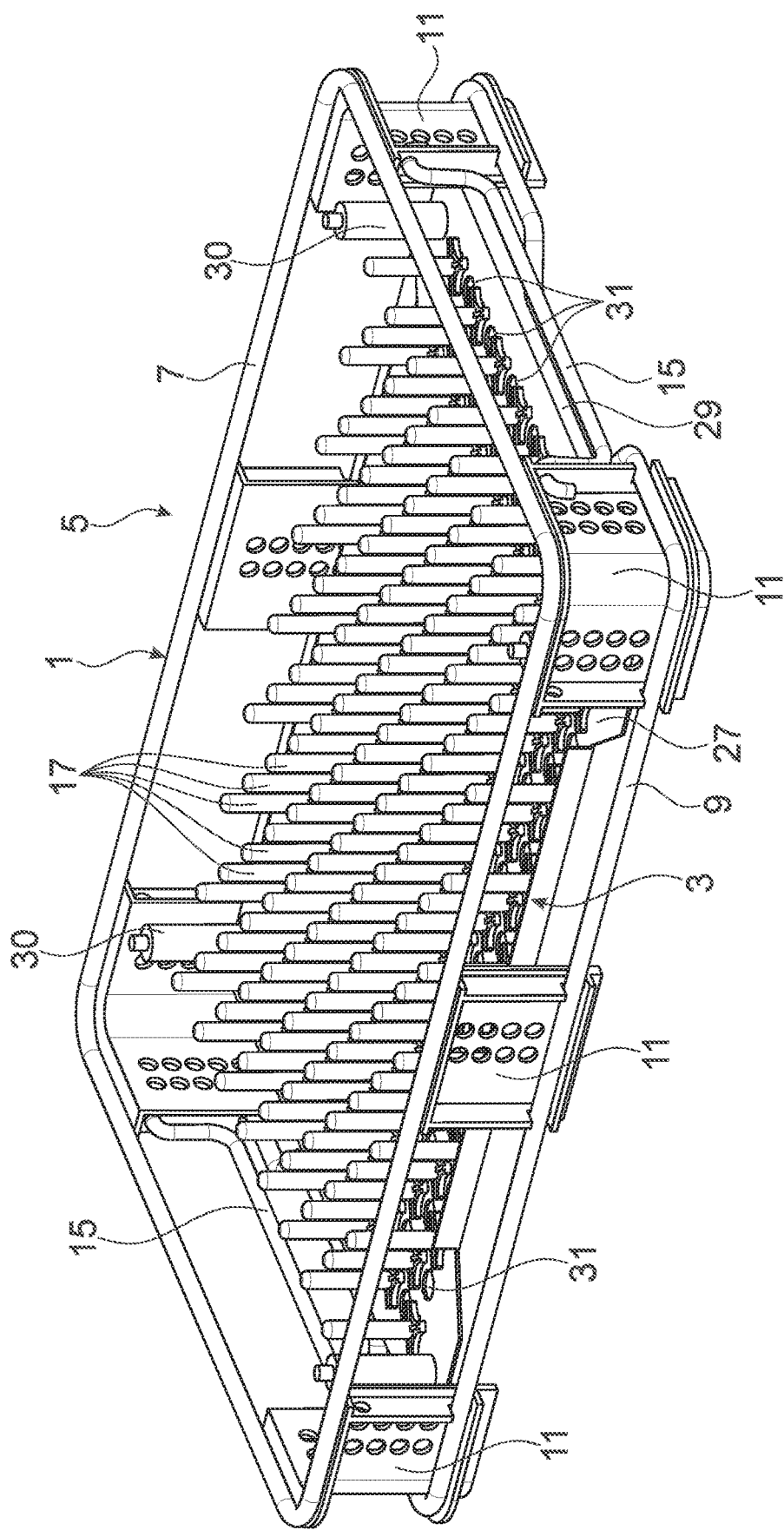
FIG. 5 shows a three-dimensional view of one exemplary embodiment of a workpiece basket.

FIG. 5 shows in a three-dimensional representation another exemplary embodiment of a workpiece basket 5, in which a workpiece carrier insert 3 is held by a frame 1. The frame 1 is flatter than the frame shown in FIG. 3 and includes the rods 25 described in connection with FIG. 3 on which the workpiece carrier insert 3 is placed.

The workpiece carrier insert 3 differs from the workpiece carrier insert 3 described in FIG. 4 by additional holders 17, which are situated in a portion of the recesses 31. In each second recess 31, a holder 17 is inserted, wherein the holders 17 of adjacent rows are situated offset to one another. The holders 17 in this exemplary embodiment are pin-shaped, so that workpieces may be placed on or between the holders 17.

The provision of a plurality of recesses 31 permits an arrangement of the holders 17 adaptable to workpieces and method steps. Different types of holders may be used on the same plate 27.

Figure 6:
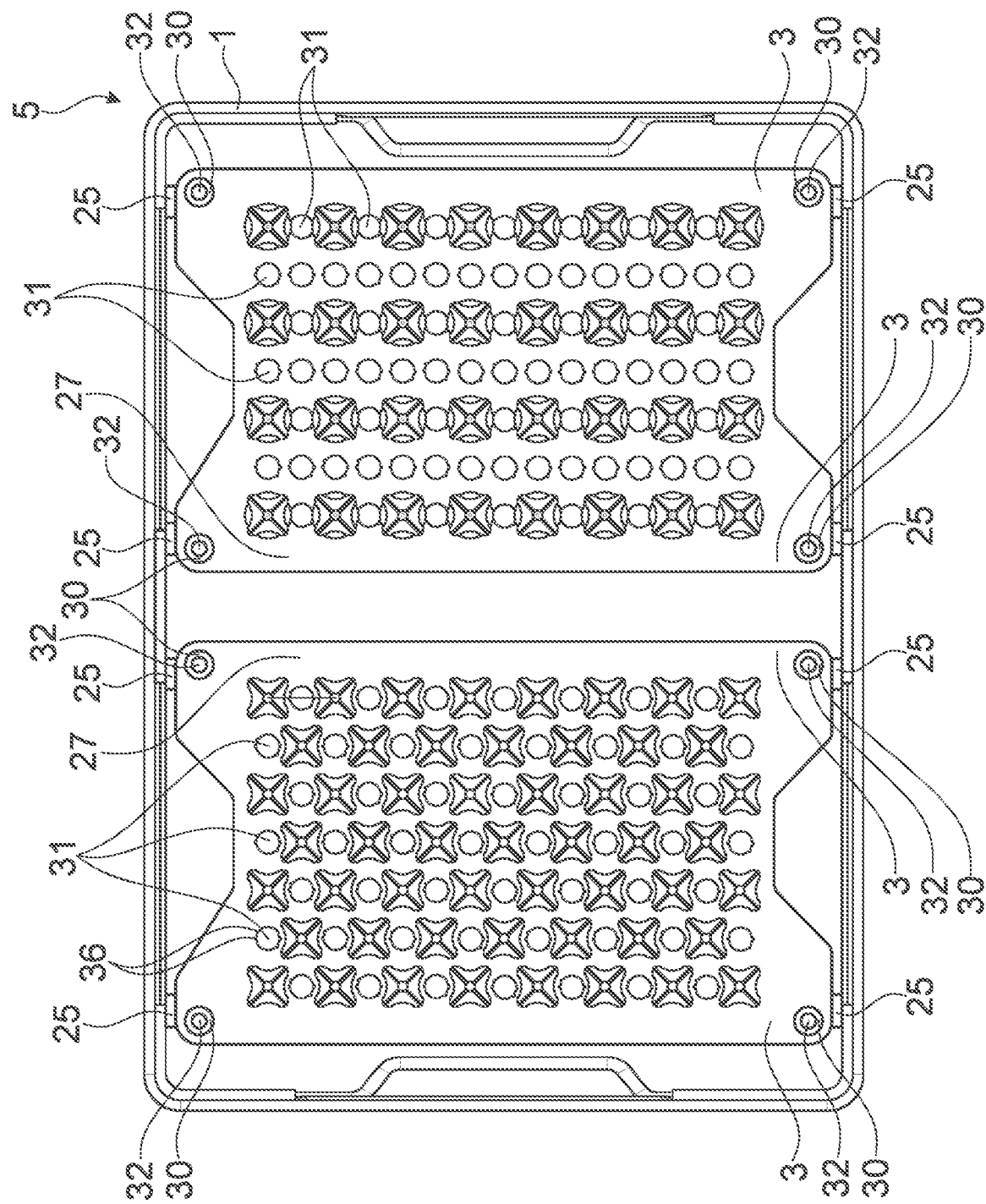
FIG. 6 shows a top view of another exemplary embodiment of a workpiece basket.

FIG. 6 shows another exemplary embodiment of a workpiece basket 5 in a top view. To avoid repetition, the description focuses on differences from the previous exemplary embodiment.

In this exemplary embodiment, two workpiece carrier inserts 3 are situated side by side on rods 25 of the frame 1. In order to hold two workpiece inserts 3, the frame 1 includes rods 25 in the corner areas and in the middle. They extend in parallel between the long sides and in a plane.

Both workpiece carrier inserts 3 have a base plate 27 similar to that described in FIG. 4 with a matrix-like arrangement of recesses 31. However, the plates 27 are only about half the size, allowing two plates 27 to be placed side by side on the rods 25.

One of the workpiece carrier inserts 3 includes holders 17 of the same type and same arrangement as described in connection with FIG. 5. The other workpiece carrier insert 3 includes holders 17 of a different type. The holders 17 are situated on the plate 27 of this workpiece carrier insert 3 only in every second row and are spaced apart from each other by a recess 31.

Holders 17 and recess 31 are connected by means of a pin-shaped connection device on the underside of the holder 17. The recess 31 has a circular basic shape with projections 36. On the pin of the holder 17 are laterally protruding lugs. When inserting the pin, the lugs slide through the projections 36. The pin can be inserted into the recess 31 up to a cross-sectional enlargement serving as a stop. Turning the holder 17 once the pin is inserted causes a lock, since in this way, the lugs are offset to the projections 36, which prevents the holder 17 from being withdrawn or falling out without previously turning back.

The exemplary embodiment shows that the plates 27 may be equipped with different holders 17 and different workpiece carrier inserts 3 may be combined in the same workpiece basket 5. It is, of course, also possible to provide different types of holders on the same plate 27.

It is possible to stack multiple workpiece carrier inserts 3 on top of each other by placing the plate 27 of a workpiece carrier insert 3 on the spacers 30 of the plate 27 situated beneath the spacers. In order to avoid slippage, the spacer 30 has a pin 32 on its upper side, which engages in a recess on the underside of the plate 27 situated thereon.

When workpiece carrier inserts 3 are stacked on top of each other, the height of the frame 1 is advantageously such that the workpiece carrier inserts 3 do not protrude beyond the frame upperside and one additional workpiece basket 5 is stackable on the frame 1.

Figure 7:
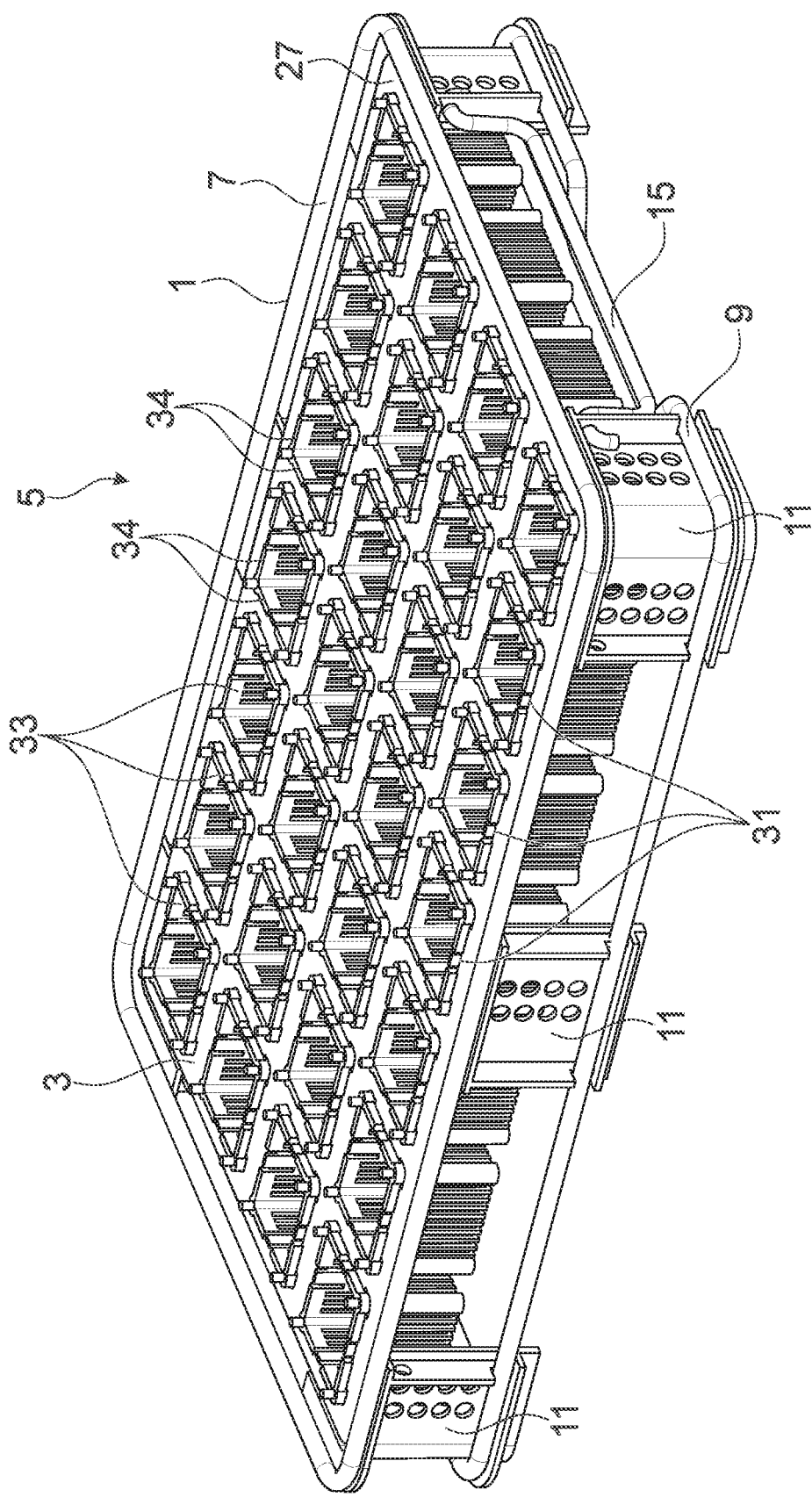
FIG. 7 shows a three-dimensional view of another exemplary embodiment of a workpiece basket.

FIG. 7 shows another exemplary embodiment of a workpiece basket 5 in a three-dimensional view. To avoid repetition, the description focuses on differences from the exemplary embodiment described in FIG. 5.

In this exemplary embodiment, the workpiece carrier insert 3 includes a plurality of receptacles, into which workpieces (not shown in FIG. 7) may be placed.

The workpiece carrier insert 3 comprises a metal plate 27 having a plurality of square recesses 31 situated in the form of a matrix, into which the baskets 33 as exemplary embodiments of receptacles for workpieces are inserted.

The plate 27 of the workpiece carrier insert 3 is held with a holding device in the upper area of the frame 1. This can be done, for example, using screws 16 or rods 25. A frame 1 having rods 25 has already been described in connection with FIG. 3; however, the rods 25 in this embodiment are situated in the upper area of the frame 1. The plate 27 differs from the plate 27 described in connection with FIGS. 4 and 5 essentially only by the shape and arrangement of the recesses 31.

The baskets 33 are mounted in the recesses, so that the upper basket edge 34 rests on the plate 27 and the basket 33 is detachably fixed by means of a clip connection.

Such a workpiece carrier insert 3 with baskets 33 may also be designed to be stackable. In this case, the spacers, which are placed underneath during stacking on the plate 27, are situated on the underside of the plate 27.

It is also conceivable in another exemplary embodiment of a workpiece carrier insert (not shown) to place the baskets 33 on a bottom plate, wherein the baskets 33 may be stacked.

Figure 8:
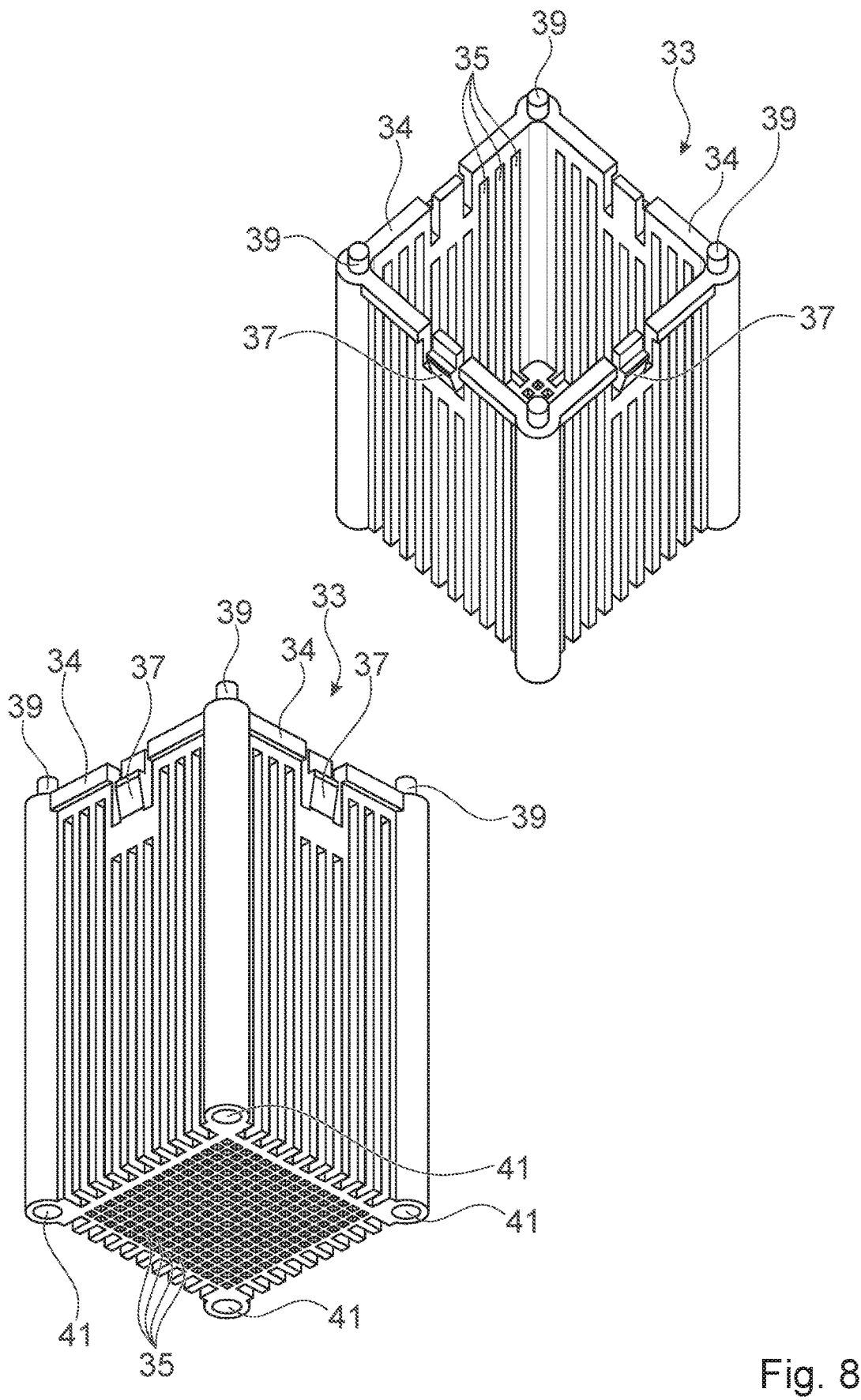
FIG. 8 shows three-dimensional views of one exemplary embodiment of a basket.

FIG. 8 shows one exemplary embodiment of a rectangular basket 33 for the workpiece carrier insert 3 shown in FIG. 7 in three-dimensional views obliquely from above and below. The basket edge 34 has an enlarged cross-sectional area, which rests on the plate 27 when the basket is mounted in the recess 31.

The basket 33 has elongated recesses 35 at its sides and on the underside, which is a grid bottom, so that the workpieces are accessible from all sides during the production steps. Clips 37 in the upper area of the side walls lock with the plate 27 when the basket 33 is inserted.

Pins 39 on the upperside of the basket 33 on the basket edge 34 and recesses 41 at the bottom enable a cover to be placed or several baskets 33 to be stacked one on top of the other, so that the pins 39 engage in the recesses 41.

Figure 9:
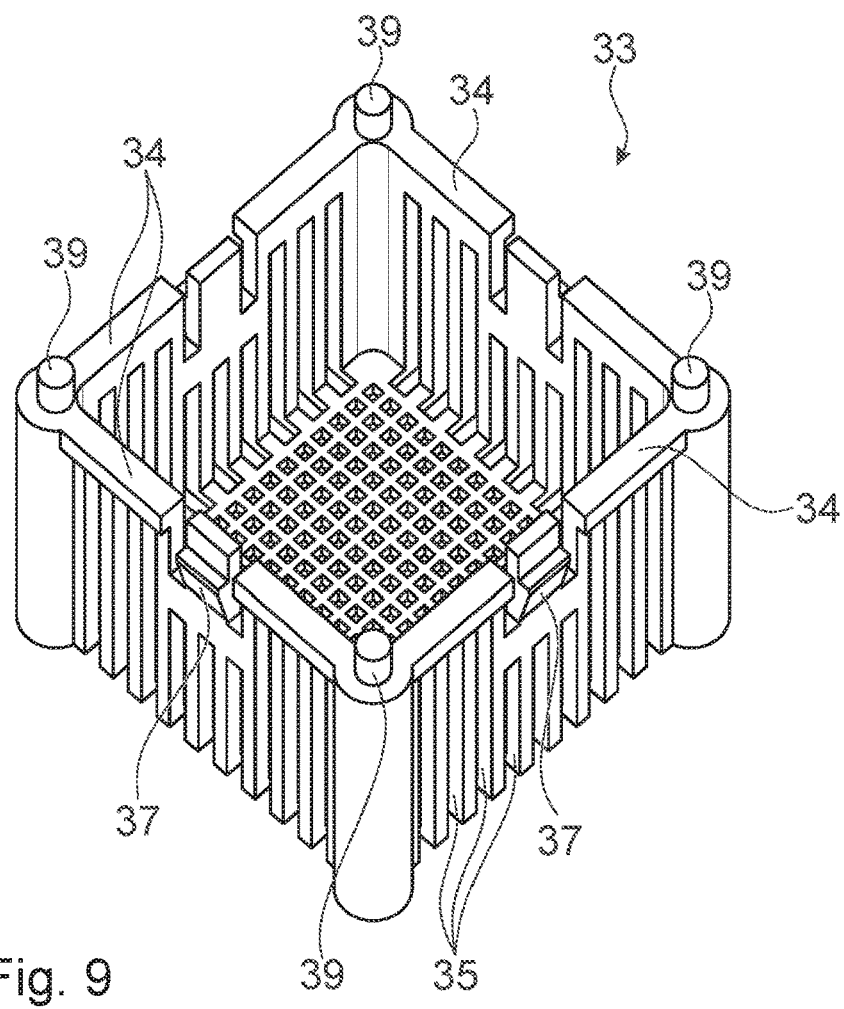
FIG. 9 shows a three-dimensional view of another exemplary embodiment of a basket.

FIG. 9 shows one exemplary embodiment of a basket 33 for the workpiece carrier insert 3 shown in FIG. 7, in a three-dimensional view obliquely from above. It differs from the previously described basket 33 only by its lower height, which is half as high. Two workpiece carrier inserts 3 equipped with such flat baskets 33 and stacked one on top of the other have a height similar to a workpiece carrier insert 3 equipped with the baskets from FIG. 8.

Figure 10:
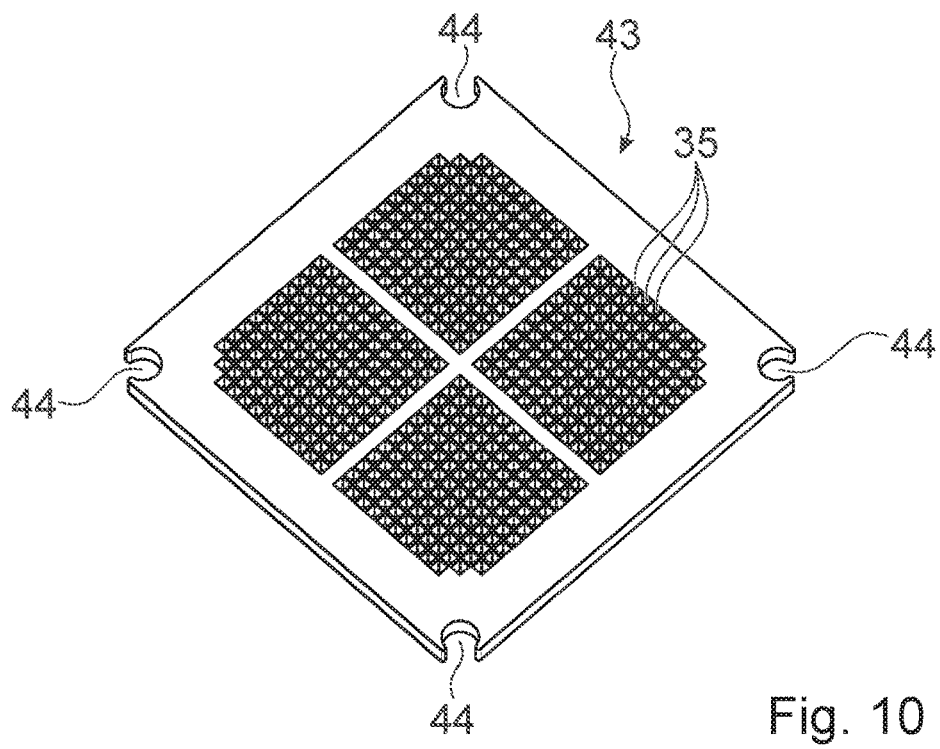
FIG. 10 shows a three-dimensional view of one exemplary embodiment of a cover.

FIG. 10 shows one exemplary embodiment of a cover 43 for the baskets 33 shown in FIGS. 8 and 9. The shape and size of the cover 43 corresponds to the basket edge 34. The cover 43 has recesses 44 on the corners, into which the pins 39 of the basket 33 covered by the cover may engage. The cover 43 also has recesses 35 formed by a grid-shaped area, so that the workpieces are also accessible through the cover 43.

Such covers 43 may be fastened to the underside of a workpiece carrier insert 3 having a plurality of baskets 33. When stacking such workpiece carrier inserts 3, the covers 43 are placed on the underside on the baskets 33 of the workpiece carrier insert 3 below.

FIG. 11 shows one exemplary embodiment of a pallet 45 on which multiple workpiece baskets 5 of different heights are stacked, and with different workpiece carrier inserts 3 in a three-dimensional view.

Multiple stacks of work baskets 5 are situated side by side on the pallet 45. The pallet 45 enables multiple workpiece baskets 5 to be transported to a production station and a production step for workpieces in multiple workpiece baskets 5 to be carried out simultaneously.

The free combinability of frames 1 of different height and with different holding directions with various workpiece carrier inserts 3, in which different receptacles 33 and holders 17 for workpieces may also be combined with each other, results in a high degree of flexibility and adaptability in the configuration of the workpiece baskets 5 as such, as well as in their composition by stacking. The frame heights in a set of workpiece basket systems are advantageously multiples of a basic height that corresponds to the height of the flattest workpiece basket 5. For example, there are workpiece baskets 5 having the basic height, double the basic height and triple the basic height. In this way, it is possible to form stacks of the same height in a simple manner. In one stack, for example, there are two workpiece baskets of triple the basic height and in a stack of equal height, there are two workpiece baskets of double the basic height and two workpiece baskets of the basic height.

It is possible to quickly and inexpensively adapt workpiece baskets 5 to changing production conditions by replacing both receptacles 33 and holders 17 as well as workpiece carrier inserts 3 as a whole. In addition, the combinability is material-saving, since the individual components, be it frames 1 or workpiece carrier inserts 3 or their holders 17 and receptacles 33, may be combined with one another. Thus, it is possible in the production preparation to form workpiece baskets 5 for different and rapidly changing production conditions from a set of different frames 1, which may be stacked on top of each other, but have different heights, and different workpiece carrier inserts 3 and different receptacles 33 and holders 17.

The features indicated above and in the claims, as well as the features which may be seen in the figures, may be advantageously implemented both individually as well as in various combinations. The invention is not limited to the exemplary embodiments described, but may be modified in many ways within the scope of expert knowledge.

REFERENCE NUMERALS 1 frame
3 workpiece carrier insert
5 workpiece basket
7, 9 wire
11 perforated sheet metal strip
14 wire area
15 handle
16 screw
17 holder
18 grid plate
19 connection device
20 projection
21 pin
25 rod
27 plate
29 edge
30 spacer
31 recess
32 pin
33 basket
34 basket edge
35 recess
36 projection
37 clip
39 pin
41 recess
43 cover
44 recess
45 pallet

What is claimed is:

1. A workpiece basket system, including:
   at least one replaceable workpiece carrier insert; and
   a frame with a holding device for the at least one workpiece carrier insert, which may be inserted or is inserted into the frame so that when the at least one workpiece carrier insert is inserted, the frame and the at least one workpiece carrier insert together form a workpiece basket;
   wherein the frame is designed in such a way that multiple frames may be stacked one on top of the other;
   wherein the holding device is designed in such a way that the holding device holds the workpiece carrier insert in a detachable manner; and
   wherein the frame comprises a wire upper edge and a wire lower edge spaced apart from each other and fixedly connected by sheet metal strips, with large area recesses between the metal strips.

2. The workpiece basket system according to claim 1, wherein the holding device is designed in such a way that that the holding device holds the at least one workpiece carrier insert by a screw connection and/or by a press connection and/or by assembly and/or by friction.

3. The workpiece basket system according to claim 1, wherein the frame is designed to insert into the frame multiple workpiece carrier inserts, so that the workpiece carrier inserts are situated one on top of the other and/or side by side.

4. The workpiece basket system according to claim 1, wherein the workpiece carrier insert includes at least one receptacle or one holder for at least one workpiece.

5. The workpiece basket system according to claim 4, wherein the receptacle or the holder is detachably connected to a plate of the workpiece carrier insert and is replaceable.

6. The workpiece basket system according to claim 5, wherein the receptacle or the holder is connected to the plate by a clamping connection and/or a latching connection and/or a screw connection or by assembly.

7. The workpiece basket system according to claim 5, wherein the plate comprises recesses, in which the receptacles and/or the holders for workpieces may be inserted and/or clamped and/or latched.

8. The workpiece basket system according to claim 4, wherein the workpiece carrier insert comprises a grid plate on which the receptacles and/or the holders may be clamped or placed and/or in the recesses of which the receptacles and/or the holders may be clamped and/or inserted.

9. The workpiece basket system according to claim 1, wherein the workpiece carrier insert comprises metal and/or plastic and the frame is metal.

10. A set of a plurality of workpiece basket systems according to claim 1, wherein at least one of the workpiece carrier inserts is insertable into more than one of the frames to form a workpiece basket; and wherein the workpiece carrier inserts of at least two workpiece basket systems differ.

11. The set according to claim 10, wherein each workpiece basket system has a frame height from a group of predefined frame heights and the frame heights of at least two frames differ.

12. The set according to claim 10, wherein the receptacles and/or the holders of one of the workpiece carrier inserts differ in terms of their shape and/or arrangement from the receptacles and/or the holders of another workpiece carrier insert.

13. A workpiece basket system, including:
at least one replaceable workpiece carrier insert; and
a frame with a holding device for the at least one workpiece carrier insert, which may be inserted or is inserted into the frame so that when the at least one workpiece carrier insert is inserted, the frame and the at least one workpiece carrier insert together form a workpiece basket;
wherein the frame is designed in such a way that multiple frames may be stacked one on top of the other;
wherein the holding device is designed in such a way that the holding device holds the workpiece carrier insert in a detachable manner;
wherein the frame is designed to insert into the frame multiple workpiece carrier inserts, so that the workpiece carrier inserts are situated one on top of the other and/or side by side; and
wherein at least two of the multiple workpiece carrier inserts differ.

14. A workpiece basket system, including:
at least one replaceable workpiece carrier insert; and
a frame with a holding device for the at least one workpiece carrier insert, which may be inserted or is inserted into the frame so that when the at least one workpiece carrier insert is inserted, the frame and the at least one workpiece carrier insert together form a workpiece basket;
wherein the frame is designed in such a way that multiple frames may be stacked one on top of the other;
wherein the holding device is designed in such a way that the holding device holds the workpiece carrier insert in a detachable manner; and
wherein the frame includes fold-out handles.

* * * * *